Dec. 28, 1937. C. RINEHIMER 2,103,756
ADVERTISING DEVICE
Filed Aug. 6, 1936
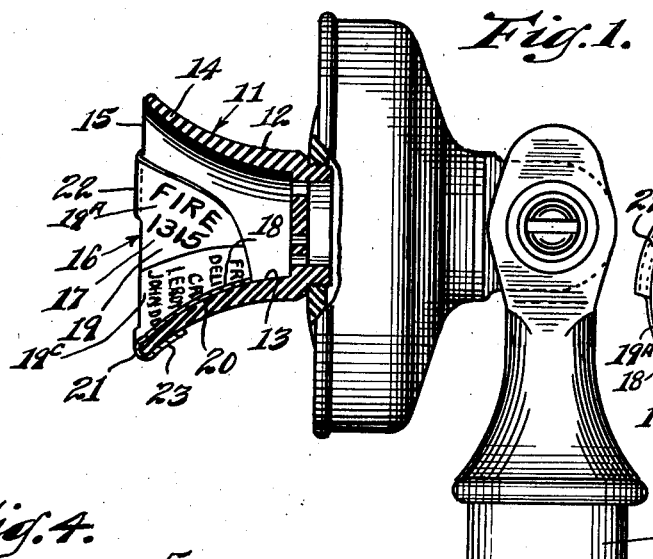
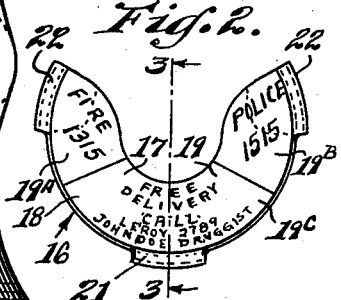
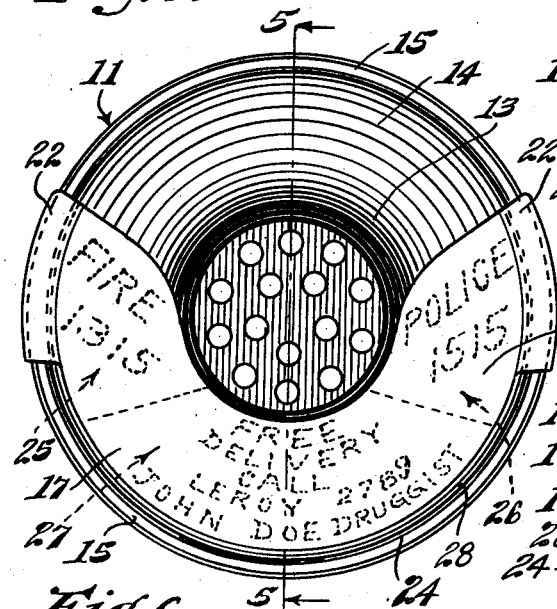
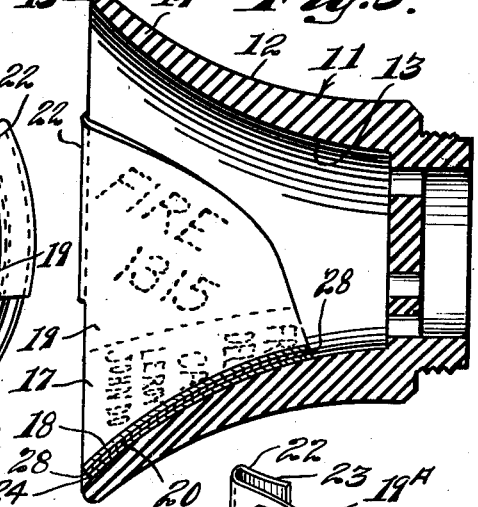
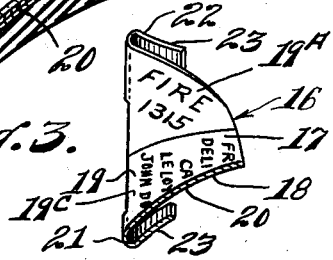
Inventor;
Clarence Rinehimer,
By Joshua R. H. Potts
his Attorney.
Witnesses:
E. E. Wessels
Aasta E. Matien Patented Dec. 28, 1937

2,103,756

UNITED STATES PATENT OFFICE 2,103,756

ADVERTISING DEVICE

Clarence Rinehimer, Chicago, Ill.

Application August 6, 1936, Serial No. 94,522

3 Claims. (Cl. 40—10.5)

This invention relates to advertising devices and has for its general object to provide an advertising device for use in conjunction with such an article as the mouthpiece of a telephone.

A specific object is the provision of a device bearing advertising which may be easily affixed to the mouthpiece of a telephone or such article, especially without damaging the mouthpiece or interfering with the operation of the telephone in any way.

Among others, is the provision of a device of the kind described which will remain securely in place despite the handling frequently given to a telephone.

Another object is the provision of such a device which will be compact and take up a minimum of space and allow the advertising to be effective without detracting from the appearance of the telephone.

Another object is to provide a device of the kind described, inexpensive enough, for example, to be given away as a souvenir or a premium.

Other objects and advantages will appear and be brought out more fully in the following specification, reference being had to the accompanying drawing, in which:

Fig. 1 is a sectional view of a telephone mouthpiece showing the preferred form of the device of my invention applied to a mouthpiece;

Fig. 2 is a front view of the advertising device shown in Fig. 1;

Fig. 3 is a view of the same advertising device taken on line 3—3 of Fig. 2;

Fig. 4 is a front view of a modified form of the advertising device shown attached to a mouthpiece;

Fig. 5 is a view of the same taken on the line 5—5 of Fig. 4; and

Fig. 6 is a face view of a printed sheet adapted to be secured to the advertising device.

In the first form, that is the form shown in Figs. 1, 2, and 3 of the two forms which I have selected for purposes of illustrating the principles of my invention, as shown in the drawing, there is a telephone 10 having a mouthpiece 11 with a curvilinear outer surface 12 and a curvilinear inner surface 13 forming a flange 14, and a usual peripheral edge 15.

To this mouthpiece is adapted to be secured an advertising device 16, shown clearly in Fig. 2, having a web 17 which is curved, as shown at 18, to conform to the curve formation of the mouthpiece as will be readily understood.

The advertising device 16 has an outer face 19, having, in the form shown, spaces 19a, 19b, and 19c for printed matter and the web 17 also has an inner face 20.

Integrally formed with the web 17 and extending therefrom are holding arms 21 and 22, which are bent around the peripheral edge 15 of the mouthpiece, as at 23.

The device 16 is preferably made of a material with some resiliency, such as Celluloid so that it may not only be attached easily to the mouthpiece by pushing it on the mouthpiece, but will be effectively retained as will be manifest without detailed description.

When the device is in place the peripheral area of the mouthpiece will be located between the web of the advertising device and the three holding arms. The holding arms may be suitably positioned with respect to the webs so as to permit them to ride around the outer curvilinear surface 12 and press against said surface to hold the device on the mouthpiece. In the form shown in Fig. 1 the advertising device is provided with one space 19a, showing the telephone number of the fire department. In the opposite space 19b is shown the telephone number of the police department. Between these spaces is another space, 19c, showing advertising for a druggist.

Nothing is more important when fire or police protection is needed than to have the telephone numbers of the departments available instantly. Experience shows that either through fright or negligence in a great many cases the number is not available when needed. Much valuable time is lost with obvious consequences. According to my invention, instead of having to rely on the telephone book, which may be misplaced, or which may take time to find, or which may be lost, I have provided an advertising device which is inexpensive and which can be easily attached to a telephone and retained thereon without the slightest injury or detriment in any way to the telephone or user. It is to the interest of the telephone user to have such a device on the telephone so that he will have the telephone numbers immediately in case of need. It will be manifest if advertising is added to this device, such as the drug advertising illustrated, the same will be highly effective inasmuch as it would be ever present advertising on a constantly used device such as a telephone, and inasmuch as it would be advertising which could not fail to be seen by every user in every case of use.

Fig. 4 shows another form of advertising device applied to a mouthpiece and is the same as that shown in Figs. 1, 2, and 3, with certain exceptions. Whereas there were three holding arms provided for in the form shown in Figs. 1, 2, and 3, I have shown a similar device provided with only two arms in Figs. 4 and 5, the two upper arms in Figs. 1, 2, and 3 being located similarly to the two arms in Figs. 4 and 5. Tests show that the device may be effectively held on a mouthpiece with two of the arms described, but in my preferred form I use three arms to further insure retention of the device on the mouthpiece in the event of rough handling.

There is also the further difference that in the form shown in Figs. 1, 2, and 3, the device is opaque, and the device is provided with printed matter and preferably variably colored in the different spaces, whereas in the form shown in Figs. 4 and 5, the advertising device is transparent and includes the use of a printed sheet which may be of paper or other suitable substance having colors and print which show through the web. This sheet 24 is further shown in Fig. 6 and is cut in the shape shown to correspond with the form of the other part of the advertising device and the mouthpiece, and, as will be manifest, from the drawing, has a red fire space 25, a blue police space 26, and a white advertising space 27. This printed sheet 24 is adapted to be provided with a layer of cement glue 28 on the printed side and thereby will be secured to the other portion of the advertising device. It will be understood, of course, that the advertising device may be made of an opaque resilient material, for example, white colored material and have the letters cut out of the web for the advertising in which the black background of the telephone mouthpiece would show through the white field of the advertising device.

It will be understood of course that instead of using two or three arms as I have shown, other equivalent arrangements may be used to accomplish the holding of the advertising device to the mouthpiece and therefore it should be distinctly understood that my invention is not limited to the kinds or number of arms shown or to arms nor to the material stated, nor to the structure. Other materials and structures may be substituted with other advertising arrangement as will be found expedient. It is believed that the advantages of the invention will be manifest without further description. It will, of course, be understood that whereas the advertising device of Fig. 1 has been illustrated as being opaque with the letters cut out of the web, it will be manifest that the advertising device may be made transparent instead and used with the printed sheet 24. It will also be manifest that instead of using the printed sheet 24 and transparent device of Fig. 4, the printed sheet may be omitted and the device may be made opaque with the letters cut out as in Fig. 1.

While I have illustrated and described the preferred forms of construction for illustrating the principles of my invention and for carrying my invention into effect the same are capable of variation and modification without departing from the spirit of the invention. I therefore do not wish to be limited to the construction set forth but desire to avail myself of such variations and modifications as come within the scope of the appended claims.

Having thus described my invention, what I claim as new and desire to secure by Letters Patent is:

1. A telephone mouthpiece of the flared tubular type, in combination with an advertising device comprising a segmental web portion conforming substantially to the shape of the inner surface of said mouthpiece and extending more than 180° around the same, and a pair of resilient arms adjacent the ends of said web and having portions extending over the edge of said mouthpiece beyond a median passing through the longitudinal axis of the mouthpiece, said arms detachably securing the web in position.

2. A telephone mouthpiece of the flared tubular type, in combination with an advertising device comprising a segmental web portion conforming substantially to the shape of the inner surface of said mouthpiece and extending more than 180° around the same, and a pair of resilient arms adjacent the ends of said web and engaging over the edge of said mouthpiece, said arms having portions extending on each side of a median passing through the longitudinal axis of the mouthpiece and detachably securing the web in position.

3. The combination as set forth in claim 1 further characterized by a third resilient arm substantially midway of the outer edge of said segmental web and engaging over the adjacent edge of the mouthpiece, substantially as described.

CLARENCE RINEHIMER.